United States Patent [19]

Dyson

[11] 4,383,862
[45] May 17, 1983

[54] CONCRETE

[75] Inventor: John M. Dyson, Huddersfield, Great Britain

[73] Assignee: Domocon S.A., Chur, Switzerland

[21] Appl. No.: 310,940

[22] Filed: Oct. 13, 1981

[30] Foreign Application Priority Data

Oct. 11, 1980 [GB] United Kingdom ............... 8032915

[51] Int. Cl.³ ............................................ C04B 21/00
[52] U.S. Cl. ........................................ 106/88; 106/98
[58] Field of Search ....................... 106/86, 88, 97, 98

[56] References Cited

U.S. PATENT DOCUMENTS

| | | | |
|---|---|---|---|
| 3,119,704 | 1/1964 | Harrell et al. | 106/88 |
| 4,144,078 | 3/1979 | Colwell | 106/98 |

*Primary Examiner*—James Poer
*Attorney, Agent, or Firm*—Reising, Ethington, Barnard, Perry, Brooks & Milton

[57] ABSTRACT

A method of producing aerated concrete, that is, concrete in which a gas is entrained, comprises forming a mortar mix, which includes all the components of the concrete except for the gas. The mix is then pumped at a predetermined rate, to blending means. Gas is fed under pressure to blending means via control valves.

The blending of the mix with the gas takes place in a substantially closed chamber.

7 Claims, 1 Drawing Figure

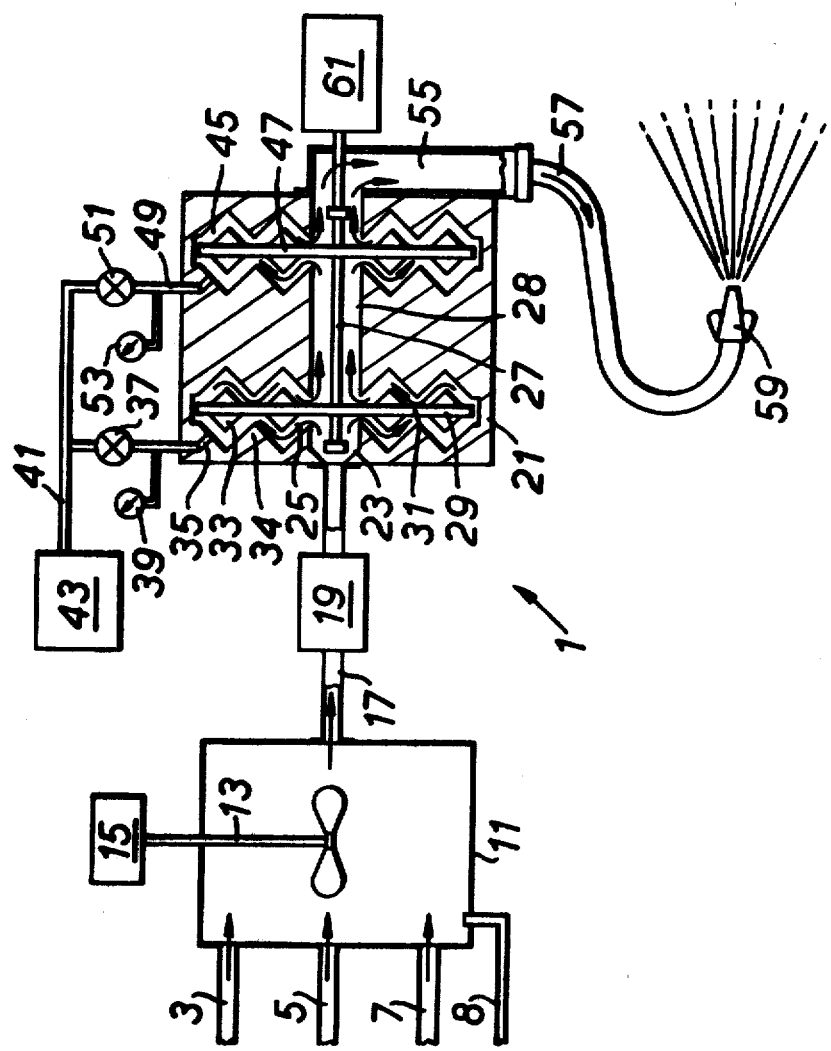

CONCRETE

This invention relates to concrete and in particular to light weight concrete. More particularly this invention relates to light weight concrete in which gas is entrained, such concrete being known as aerated, (if the gas is air), cellular or gas concrete. Reference will be made hereinafter to aerated concrete, but this is intended to refer to concrete having any gas entrained therein.

Hereto aerated concrete has been made on site by mixing together cement, sand and water in a conventional concrete mixer and then adding a quantity of foam made in a foam generator. The foam comprises water and a small quantity of foaming agent. Foaming agents which may be used include the following:

(a) saponified wood resins;
(b) saponified Vinsol resin;
(c) certain sodium compounds of aliphatic and aromatic sulphates;
(d) certain sulphates of petroleum derivatives;
(e) surfactants;
(f) protein based compounds.

Once the foam has been added to the mortar mix, further mixing produces the aerated concrete.

Aerated concrete is used for insulation where strength is not important and for precast items such as building blocks for single and two-storey buildings where a typical strength of 2.8 N/mm$^2$ is considered adequate.

Moisture absorption by aerated concrete is usually high which tends to limit its usefulness in exposed situations. This may to some extent be overcome by applying to the concrete a coating of a more impermeable material.

Aerated concrete made as described above is not particularly homogeneous, particularly with regard to the size and distribution of the entrained gas bubbles. Indeed in most cases the gas bubbles are not discrete but are interconnected. Accordingly, it can be understood that the strength of aerated concrete is not very high and is unreliable and that the material is permeable. Even with the most accurate and consistent batching of materials for the mortar and the careful selection of foaming additive, the resultant aerated concrete is still of poor homogeneity.

According to the present invention there is provided a method for producing aerated concrete comprising forming a mortar mix and then blending together said mix and a gas in predetermined proportions within a substantially closed chamber. The mortar mix includes all the components of the eventual aerated concrete except for the gas. Thus the mortar mix may include, in addition to cement, sand and water, a foaming agent such as one of the agents referred to above.

Preferably the mortar mix is fed, more preferably pumped, to blending means, said blending means having connection means for feeding gas under pressure to said blending means. The blending means includes said substantially closed chamber. Preferably the blending means comprises a plurality of chambers, said chambers being arranged coaxially and for sequential flow of the mortar mix therethrough. Gas is fed under pressure to one or more of said coaxial chambers. The rates at which the mortar and the gas are fed to the chambers can be controlled to ensure that the mortar/gas ratio in the resultant aerated concrete is precisely as desired.

Preferably each of the chambers is occupied by a rotary mixer which occupies substantially the entire space defined by the chamber, each mixer being substantially disc shaped but being provided with projections extending out of the plane of the disc on both sides thereof, said projections lying within recesses between projections extending from the walls of the chambers. On rotation of the mixers the projections thereon pass between the projections on the walls of the chambers and this arrangement ensures efficient blending of the mortar mix with the gas fed under pressure to the chambers. Such blending means are similar to those described in U.K. patent specification No. 1,390,180.

The aerated mortar formed in the above-described blending means is discharged from the blending means via a pipeline to the point at which delivery is required. It may, for instance be sprayed directly onto a surface to build up a wall or fed into a mould to form, for instance, a building block.

It is found that aerated concrete made by a method of the present invention is highly homogeneous in the sense that the gas bubbles are discrete, are of a uniform size and are uniformly spread throughout the aerated concrete. Furthermore, by the careful control of the rate of pumping of the mortar mix and the gas flow to the blending means, concrete of known density can be produced with no short term or long term variations.

Preferably the sand used to form the mortar mix should be a fine sand with rounded particles. Sands with irregular or angular grain shapes are not preferred and there may be difficulties in pumping.

The preferred grade of sand to be used will depend on the type of sand and the following is intended only as a rough guide to preferred grading details. In practice, preliminary trials should be carried out including compression testing of samples of aerated concrete before using the material for structural purposes.

| B.S. test sieve size | % of sand sample passing through sieve | | |
|---|---|---|---|
| | essential requirement | preferred | most preferred |
| 5 mm | 100 | 100 | 100 |
| 3.35 mm | 100–99.5 | 100 | 100 |
| 2.36 mm | 100–99.0 | 100–99.5 | 100 |
| 1.18 mm | 100–99.0 | 100–95.0 | 100–97.0 |
| 600 m | 90–50 | 85–60 | 80–70 |
| 300 m | 60–10 | 40–15 | 30–20 |
| 150 m | 30–0 | 25–2 | 20–5 |

The cement is preferably fresh ordinary Portland cement. Aged cement in which lumps of hardened material are found should preferably not be used.

For structural grades of aerated concrete a sand/cement ratio of 3.5:1, or proportions with smaller amounts of sand, should be used. Aerated concrete for non-load bearing use, such as for insulation purposes, can be formed with leaner mixes. However, the careful selection of the sand is then even more important since a high cement content improves the "pumpability" of the mixture.

Pulverised fuel ash may be included in the fine aggregate of low strength mixes. It is desirable to reduce the water/cement ratio as far as possible consistent with the attainment of a workable mix. However, the exclusion of coarse aggregate means that the total surface area is relatively high and, therefore, the mix requires a relatively large amount of water. Ratios of water/cement of around 0.6 and above are commonly found necessary but it is desirable to carry out test mixes to ascertain quantities to be used in practice.

The amount of foaming agent used depends on the particular foaming agent employed. Typically an amount of foaming agent of 0.5% to 2% based on the water content is used. The smaller the amount of foaming agent used the "wetter" the mix and the higher the density of the resultant aerated concrete.

The amount of gas to be fed to the blending means depends on the required use of the aerated concrete. For instance, an amount of between 10 and 40% by volume based on the volume of the resultant aerated concrete produces a product in the "structural range", that is to say with compressive strengths of from 15 $N/mm^2$ to 35 $N/mm^2$.

In order properly to control the injection of gas into the blending means, it is important to take into account the pressure within the system at the point of injection. Accurate batching of the ingredients in the mortar mix, a thorough mixing and a constant pumping speed of the blending means will not in themselves produce the desired uniformly consistent aerated concrete if there is a variation of the gas pressure to the blending means. Preferably a pressure gauge is located near to the point of gas injection so that the gas pressure at this point may be monitored. The equipment for metering the gas to the blending means must be capable of volumetric measurements over a pressure range which must be compatible with the actual pressure in the system. Where the blending means are large, it may be preferable to incorporate multiple gas entry points to avoid problems caused by premature drying out of the mortar means due to excess gas being fed through only a single air inlet.

Preferably the gas is air, carbon dioxide or a mixture of air and carbon dioxide. Although the use of air is more convenient for the majority of purposes, the addition of carbon dioxide gives advantages under certain circumstances. For instance, $CO_2$ entrained concrete has a higher capacity for absorption of radiation. It would therefore be advantageous to use $CO_2$ entrained concrete rather than air aerated concrete in the case where radiation screening is required. In addition, $CO_2$ entrained concrete may be more resistant to acids than ordinary concrete, and may be useful in applications where acid resistance is important, for instance, to line the interior of pipes along which acidic material is conveyed.

The present invention also provides a composition for forming aerated concrete comprising sand, cement, foaming agent and a silicate which co-acts with the other components of the mix to produce an aerated concrete with an increased compressive strength.

Preferably the composition is used to produce aerated concrete by a method according to the present invention, that is to say, blending together the composition and air in predetermined portions within a substantially closed chamber.

Preferably the silicate is an active silicate of magnesium, calcium, barium and/or aluminium prepared by precipitation from water glass with a salt of the appropriate metal and, optionally, mineral acid, and having a specific surface area in excess of 15 $m^2/gm$ as measured by the BET method. More preferably the silicate is an active silicate which is collodial and in the form of a hydrogel or a xerogel.

Preferably the silicate is a material or composition known as SM407 which is a pure inorganic soluble silicate supplied in powder form and which may be easily incorporated into the basic mortar mix.

The amount used is preferably in the range of from 0.5 to 4% based on the weight of the cement. The preferred range is 2 to 2.5% by weight. Increased amounts are preferably used when the concrete is being formed from contaminated sands such as sea sand with a high salt content or when the concrete is for use in an "aggressive" environment. Reduced amounts may be used for concrete of lower strength or with stable sands of optimum grading.

It is found that when aerated concrete is made from mortar mixes including such silicates, particularly when the foaming additive is selected so as to produce a closed cell microstructure, the resultant aerated concrete has improved strength, impermeability and resistance to chemical degradation.

Preferred compositions and/or methods in accordance with the present invention may make use of one or more barium compounds to improve the quality of the aerated concrete. Barium compounds may be added in amounts of between 0.05% and 2.5% by weight based on the weight of the cement.

Preferably the barium compound is a sparingly soluble barium compound, for instance, barium oxalate, barium fluoride or barium silicate hydrate having a $BaO:SiO_2$ mole ratio of 0.5:1.2:1.

The amount of such barium compounds used depends on the nature of the other components of the mortar mix and the desired gain in strength, impermeability and resistance to chemical degradation.

An embodiment of the present invention will now be described, by way of example only, and with reference to the accompanying drawing, which is a diagrammatic representation of apparatus in accordance with the present invention.

Referring to the accompanying drawing, apparatus indicated generally by 1, in accordance with the present invention, comprises mixing chamber 11. Pipelines 3, 5 and 7 supply cement, sand and water, respectively, to the chamber 11. An agitator 13, driven by a motor 15, mixes the sand, cement and water to form a mortar mix. If desired, additional components such as a foaming agent can be included in the mix by means of supply pipeline 8.

The mortar mix is removed from the mixing chamber 11 along exit pipeline 17 by a pump 19. The mix is then fed into blending means 21. The mix flows into a first substantially closed chamber 25. The chamber 25 is substantially filled by a rotary mixer 29. Mixer 29 comprises a substantially disc shaped member 31, provided with triangular projections 33 extending out of the plane of the disc 31 on both sides thereof. The projections 33 are interleaved with similar projections 34 extending from the walls of the chamber 25. In use, the mixer 29 rotates about a shaft 27 driven by a motor 61. The drive shaft 27 is aligned substantially perpendicularly to the plane of the disc 31. The rotation of the mixer 29 causes efficient blending of the mortar mix with air fed under pressure into the chamber 25 at inlet 35.

In use the mortar mix is forced radially round the mixer 29 and blended with the air. It then flows along a passage 28 lying parallel to the drive shaft 21 into a second substantially closed chamber 45. The chamber 45 is substantially filled by a rotary mixer 47 similar to the mixer 29 in the first chamber 25, and mounted on the same drive shaft 21.

In the second chamber 45, the mortar mix is again blended with air fed under pressure via inlet 49 into the chamber 47.

From the chamber 47, the aerated mix is fed along an outlet pipe 55 which is joined to a flexible tube 57. The tube 57 is equipped with a nozzle 59, by means of which the aerated mix can be directly sprayed onto, for instance, a wall of a building.

It is possible to control the proportion in which the mortar and air are blended by altering the rate at which the pump 19 feeds the mortar mix to the blending means, and/or by changing the pressure of the air from a compressor 43 along a pipeline 41 to the inlets 35 and 49. To this end, valves 37 and 51 are provided near the inlets to control the pressure, which can be monitored by means of pressure gauges 39 and 53.

All of the components of apparatus in accordance with the present invention may be of any suitable material.

I claim:

1. A method for producing aerated concrete comprising the steps of:
    (a) producing a mortar mix of water, sand, cement, a foaming agent and a silicate, said silicate being an active, colloidal silicate of magnesium, calcium, barium and/or aluminium prepared by precipitation from waterglass with a salt of the appropriate metal, and having a specific surface area in excess of 15 m$^2$/gm as measured by the BET method and which is in the form of a hydrogel or a xerogel;
    (b) pumping said mortar mix at a predetermined rate to a substantially closed chamber located within blending means;
    (c) feeding gas via gas pressure regulation means to said chamber, thereby obtaining in said blending means mortar mix and gas in predetermined proportions; and
    (d) blending said mortar mix and gas within said chamber by the action of a rotary mixer located within the chamber to produce aerated concrete mix which, when set, has a compressive strength of from 15 to 35 N/mm$^2$.

2. A method according to claim 1 wherein said blending means comprise a plurality of chambers, said chambers being arranged coaxially and such that the mortar mix flows sequentially through each of said chambers.

3. A method according to claim 1 in which said rotary mixer occupies substantially the entire space defined by the chamber, the mixer being substantially disc shaped but being provided with projections extending out of the plane of the disc on both sides thereof, said projections lying within recesses between projections extending from the walls of the or each chamber, such that on rotation of the mixer the projections thereon pass between the projections on the walls of the chambers thereby ensuring efficient blending of the mortar mix with the gas fed under pressure to the or each chamber.

4. A method according to claim 1 wherein the amount of silicate used is in the range of from 0.5% to 4% of the weight of the cement.

5. A method according to claim 1 wherein the amount of foaming agent is from 0.5% to 2% of the water content of the mortar.

6. A method according to claim 1 wherein the mortar mix further includes a sparingly soluble barium compound, the amount of said compound being from 0.05% to 2.5% by weight based on the weight of the cement.

7. A method according to claim 6 wherein the barium compound is added in an amount from 0.05% to 2.5% of the weight of the cement, said barium compound being a sparingly soluble barium compound of barium oxalate, barium fluoride or barium silicate hydrate having a BaO:SiO$_2$ mole ratio of 0.5:1.2:1.

* * * * *